United States Patent
Manotas, Jr.

(10) Patent No.: US 9,121,944 B2
(45) Date of Patent: Sep. 1, 2015

(54) MID-INFRARED VEHICLE EARLY WARNING SYSTEM

(71) Applicant: Panasonic Automotive Systems Co. of America, Div. of Panasonic Corp. of North America, Peachtree City, GA (US)

(72) Inventor: J. Jay Manotas, Jr., Peachtree City, GA (US)

(73) Assignee: Panasonic Automotive Systems Company of America, Division of Panasonic Corporation of North America, Peachree City, GA (US)

( * ) Notice: Subject to any disclaimer, the term of this patent is extended or adjusted under 35 U.S.C. 154(b) by 302 days.

(21) Appl. No.: 13/871,564

(22) Filed: Apr. 26, 2013

(65) Prior Publication Data
US 2014/0320652 A1    Oct. 30, 2014

(51) Int. Cl.
*H04N 7/18* (2006.01)
*G01S 17/89* (2006.01)

(52) U.S. Cl.
CPC ....................... *G01S 17/89* (2013.01)

(58) Field of Classification Search
CPC ......... G01S 7/89; G01S 13/93; G01S 13/931; B60Q 1/52; B60Q 1/525; B60R 1/08
See application file for complete search history.

(56) References Cited

U.S. PATENT DOCUMENTS

| | | | |
|---|---|---|---|
| 5,414,439 A * | 5/1995 | Groves et al. | 345/7 |
| 6,380,849 B1 | 4/2002 | Eckstine et al. | |
| 6,833,822 B2 * | 12/2004 | Klocek et al. | 345/8 |
| 6,919,565 B2 * | 7/2005 | Seto | 250/330 |
| 7,733,464 B2 * | 6/2010 | David et al. | 356/5.03 |
| 8,483,439 B2 * | 7/2013 | Camilleri et al. | 382/104 |
| 8,543,330 B2 * | 9/2013 | Taylor et al. | 701/408 |
| 8,593,521 B2 * | 11/2013 | Schofield et al. | 348/148 |
| 2002/0117340 A1 | 8/2002 | Stettner et al. | |
| 2003/0117615 A1 | 6/2003 | Mui | |
| 2003/0155514 A1 * | 8/2003 | Remillard et al. | 250/341.8 |
| 2005/0195383 A1 | 9/2005 | Breed | |
| 2007/0221849 A1 | 9/2007 | Tabirian et al. | |
| 2008/0119993 A1 * | 5/2008 | Breed | 701/46 |
| 2008/0147253 A1 | 6/2008 | Breed | |
| 2008/0167819 A1 | 7/2008 | Breed | |
| 2010/0110198 A1 | 5/2010 | Larson et al. | |
| 2010/0191418 A1 * | 7/2010 | Mimeault et al. | 701/36 |
| 2014/0002667 A1 * | 1/2014 | Cheben et al. | 348/164 |

OTHER PUBLICATIONS

PCT International Search Report mailed Nov. 7, 2014 by ISA/US.
PCT Written Opinion mailed Nov. 7, 2014 by ISA/US.

* cited by examiner

*Primary Examiner* — Victor Kostak
(74) *Attorney, Agent, or Firm* — Laurence S. Roach, Esq.

(57) ABSTRACT

A method of warning a driver of a vehicle of an obstacle that is more than one kilometer from the vehicle includes emitting MIR laser energy from the vehicle. The laser energy has a wavelength approximately between 3500 nanometers and 5000 nanometers. A phase conjugate lens is used to orthogonally direct a portion of the laser energy that is reflected by the obstacle to an image-capturing device or sensor within the vehicle. An image of the obstacle is displayed to the driver. The image is based on the laser energy directed to the image-capturing device.

20 Claims, 3 Drawing Sheets

MID-INFRARED VEHICLE EARLY WARNING SYSTEM

BACKGROUND OF THE INVENTION

1. Field of the Invention

The present invention relates to detecting the presence of distant objects, and, more particularly, to detecting the presence of distant objects from a motor vehicle.

2. Description of the Related Art

There is a major problem with vehicles not being able to detect objects in the road more than about a few meters away in inclement weather such as fog, rain and other conditions of low visibility. Accordingly, the vehicles are not able to provide the driver with early warning about objects in the road more than a few meters away in inclement weather. There are currently mid-infrared (MIR) range cameras that are unique and that I have determined which can penetrate fog, and smoke; however, these known devices are good for detecting objects only less than one kilometer away due to the limitations of mid-infrared light emitting diodes (LEDs). Infrared (IR) systems for vehicles do not have the ability to penetrate inclement weather such as fog and heavy rain; however, IR systems do have night vision capability.

It is also known to use radar systems within a vehicle to detect distant objects. A problem, however, is that radar systems have limited range and no visual image capability. Microwave frequencies of approximately 20 GHz, 60 GHz and 120 GHz are attenuated by water molecules around of those frequencies. Current vehicle microwave early warning systems use around 24 GHz and 73 GHz and thus cannot warn vehicle drivers in heavy fog, smoke or rain of a potential collision, until it is too late.

SUMMARY OF THE INVENTION

The invention will provide a solution to the early warning problem in inclement weather by detecting the presence of obstacles up to two kilometers away. The invention may set off audio and visual alarms in order to alert the driver before he arrives at any potential obstacles, thus preventing accidents. The invention may be able to operate in the presence of air-borne particles, such as fog, heavy rain, smoke or dust. The invention will be able to operate in darkness.

The system of the invention may include a unique mid infrared 4000 nanometer solid state laser and a 4000 nanometer mid infrared array detector for providing a long distance early warning alert system for vehicles. The inventive system is particularly advantageous in inclement weather when water particles in the air may significantly degrade the performance of prior art systems. The inventive system may be capable of detecting obstacles within a range of up to two kilometers through inclement weather and low visibility conditions such as night, heavy rain and fog. The inventive system may achieve good image reception in inclement weather by using at least one phase conjugate lens to reduce image and phase distortion due to atmospheric conditions. The invention may enable an early warning visible alarm and/or audible alarm to be given off or issued when an obstacle is a distance of one mile away, if the user so desires. Thus, the inventive system may avoid road fatalities during heavy fog, smoke and rain in daylight or night.

The invention comprises, in one form thereof, a method of warning a driver of a vehicle of an obstacle that is more than one kilometer from the vehicle. MIR laser energy is emitted from the vehicle. The laser energy has a wavelength approximately between 3500 nanometers and 5000 nanometers. A phase conjugate lens is used to orthogonally direct a portion of the laser energy that is reflected by the obstacle to an image-capturing device or sensor within the vehicle. An image of the obstacle is displayed to the driver. The image is based on the laser energy directed to the image-capturing device.

The invention comprises, in another form thereof, an obstacle early warning system for a vehicle. A laser emits MIR laser energy from the vehicle. The laser energy has a wavelength approximately between 3500 nanometers and 5000 nanometers. A phase conjugate lens receives a portion of the laser energy that is reflected by the obstacle, and orthogonally directs the portion of the laser energy to a sensor. A display device displays an image of the obstacle to the driver. The image is based on the laser energy directed to the sensor.

The invention comprises, in yet another form thereof, a method of warning a driver of a vehicle of an obstacle that is more than one kilometer from the vehicle. MIR laser energy is emitted from the vehicle. The laser energy has a wavelength approximately between 3500 nanometers and 5000 nanometers. A phase conjugate lens is used to direct a portion of the laser energy that is reflected by the obstacle orthogonally to an image-capturing device within the vehicle. A representation of the obstacle is displayed to the driver. The representation is based on the laser energy directed to the image-capturing device.

An advantage of the present invention is that it may alert a driver of obstacles in the road more than a kilometer away, even when there is fog, rain, smoke or snow in the air.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
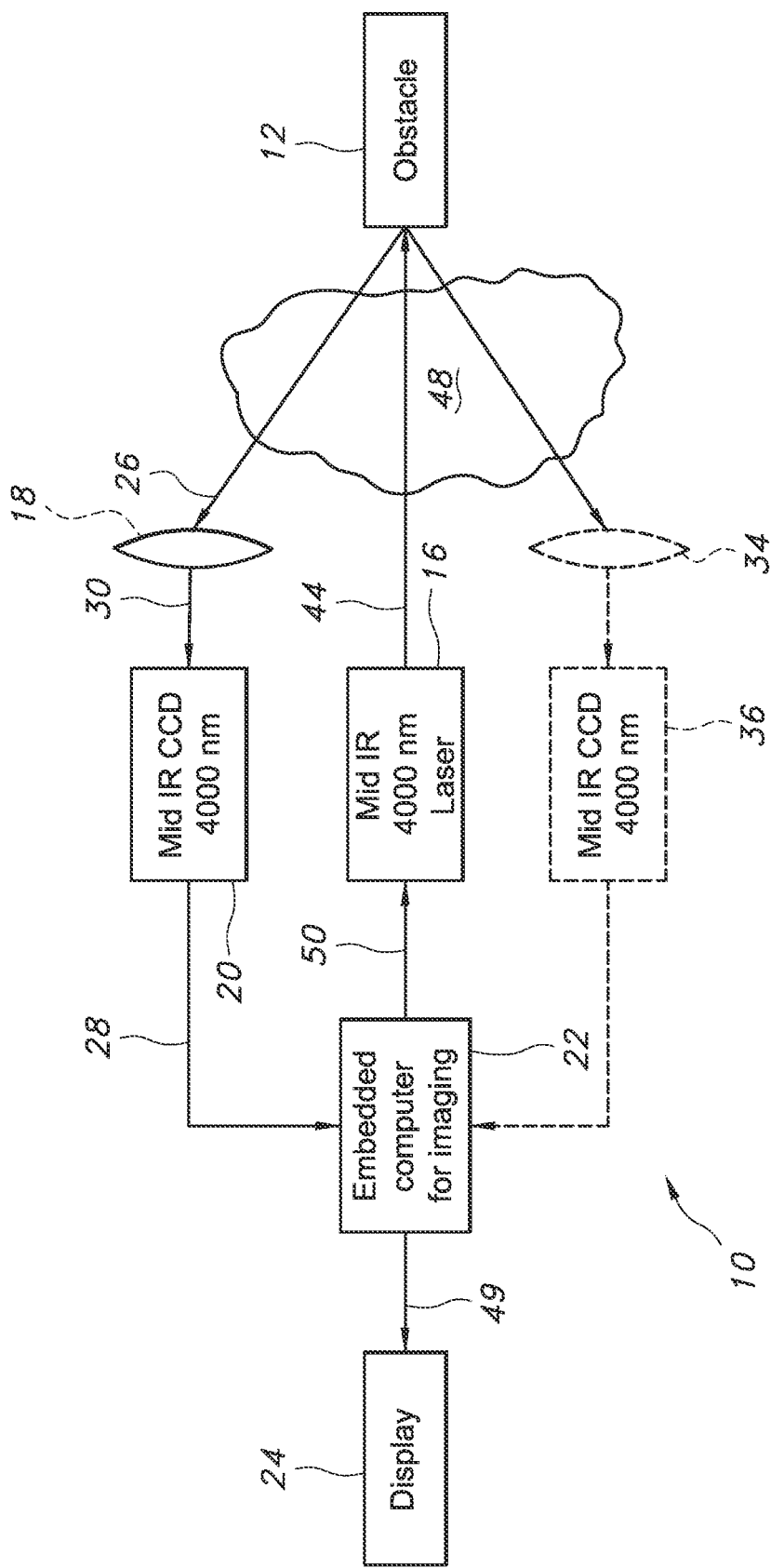
FIG. 1 is a block diagram illustrating one embodiment of a mid-infrared vehicle early warning laser system of the present invention.
Figure 2:
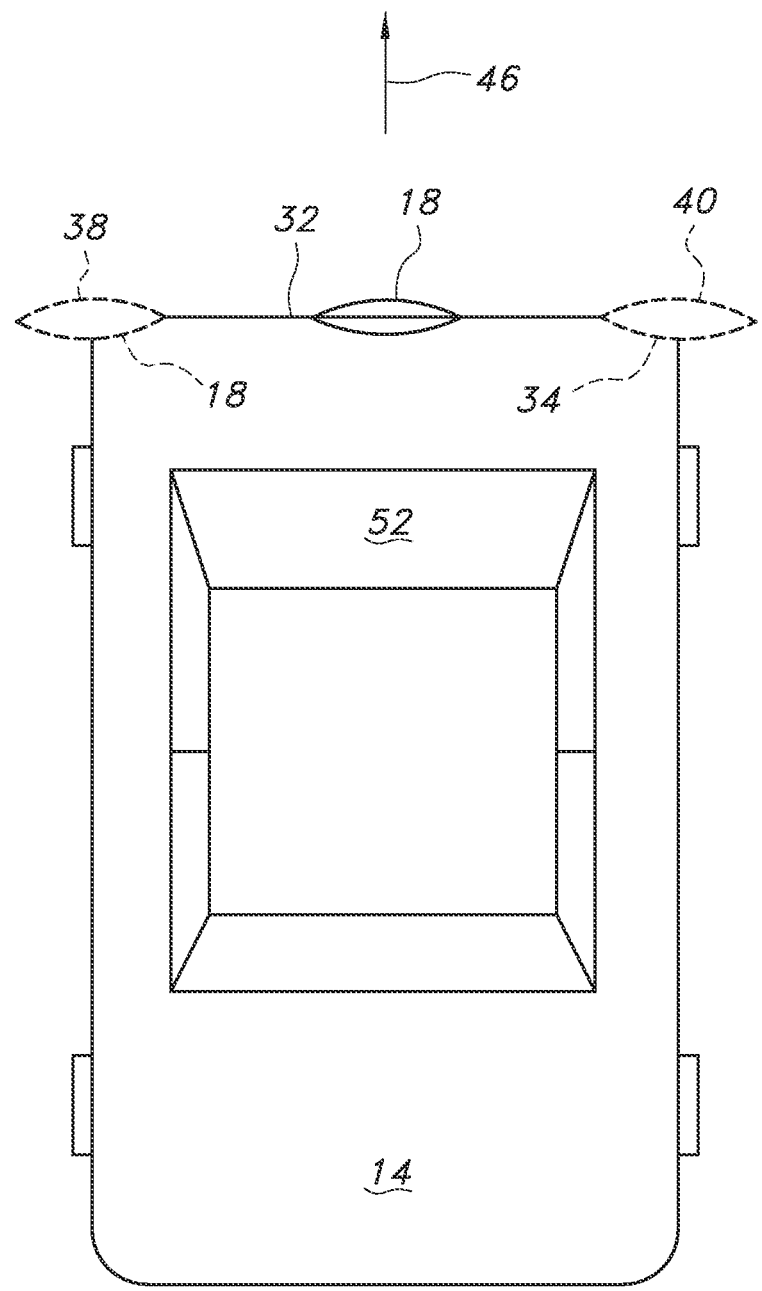
FIG. 2 is a schematic overhead view of a vehicle illustrating some possible positions of the lens(es) of the system of FIG. 1.

FIG. 1 is a block diagram illustrating one embodiment of a mid-infrared vehicle early warning laser system 10 of the present invention for detecting in inclement weather an obstacle 12 up to two kilometers away from system 10. Apparatus 10 may be installed in a vehicle 14 (FIG. 2). Apparatus 10 may include a mid infrared 4000 nanometer laser 16, a first phase conjugate lens 18, a MIR 4000 nanometer charge-coupled device (CCD) 20, an embedded computer 22 for imaging, and a display 24.

A characteristic of a phase conjugate lens, such as lens 18, is that regardless of the angle at which laser energy 26 impinges upon lens 18, the laser energy exits lens 18 in a direction perpendicular to a longitudinal axis 28 of lens 18, as shown at 30. As shown in FIG. 2, lens 18 may be positioned at a mid-point of a front end 32 of vehicle 14.

Optionally, in another embodiment, system 10 includes a second phase conjugate lens 34 and a second MIR 4000 nanometer CCD 36. In this embodiment, first lens 18 may be positioned at one front corner of front end 32 of vehicle 14, as indicated at 38 (FIG. 2), and second lens 34 may be positioned at the other front corner of front end 32 of vehicle 14, as indicated at 40.

During use, mid infrared laser 16 emits 4000 nanometer laser energy 44 in a forward direction 46 from a front end 32 of vehicle 14. Laser energy 44 goes through air-borne particles 48, such as rain, fog, smoke, snow or dust, before being reflected by obstacle 12, which may be another vehicle, for example. The reflected laser energy 44 again goes through air-borne particles 48 before being re-directed by lens 18 toward CCD 20, as indicated at 30, and being re-directed by lens 34 toward CCD 36, if lens 34 and CCD 36 are present.

The output of CCD 20 is transmitted to computer 22, as indicated at 48. Similarly, the output of CCD 36, if present, is also transmitted to computer 22. CCDs 20, 36 may include analog-to-digital converters (not shown) for converting analog image signals into digital signal outputs suitable for inputting into computer 22. Computer 22 may perform image processing on the image data received from CCDs 20, 36 and may output processed digital image data 49 that can be displayed on display 24. Computer 22 may transmit a control signal 50 to laser 16 in order to control pulses of laser energy 44.

Display 24 may display an image of obstacle 12 that is recognizable by the driver of vehicle 14. Thus, the driver may be able to see on display 24 all obstacle that is too far away for the driver to see in an unassisted fashion through a front windshield 52 of vehicle 14.

Figure 3:
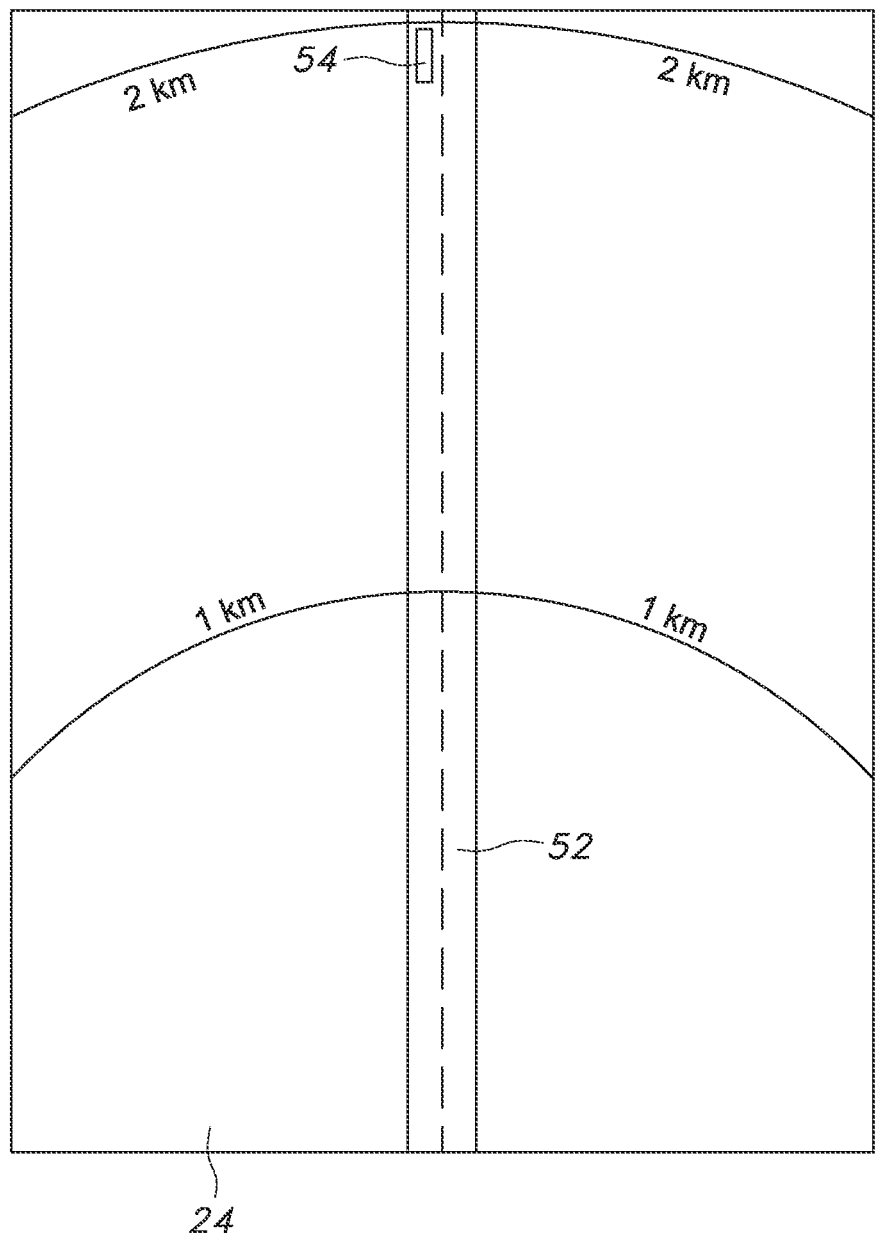
FIG. 3 illustrates one embodiment of the output of the display of the system of FIG. 1.

In another embodiment, instead of displaying a recognizable image of obstacle 12, display 24 may display a symbol or icon that represents obstacle 12. For example, display 24 may display an overhead or mapped view of an area up to two kilometers in front of the vehicle. On this overhead or mapped view, display 24 may illustrate the sensed location of obstacle 12 with a symbol, icon, or other representation. FIG. 3 illustrates a display 24 displaying an overhead or mapped view of an area up to two kilometers in front of the vehicle including a two kilometer segment of roadway 52, the location and shape of which may be received from an in-vehicle navigation system (not shown). An obstacle 12 on roadway 52 may be represented by a symbol 54 on display 24. Display 24 may include markings illustrating the distance of points on the display from the vehicle. In FIG. 3 there are two arcs showing points that are one kilometer and two kilometers away, respectively, from the vehicle.

Mid infrared laser 16, CCD 20, and CCD 36 are described herein as operating at 4000 nanometers. However, it is possible within the scope of the invention for these devices to operate at a wavelength other than 4000 nanometers. In one embodiment, these devices may operate at any wavelength within a range of approximately between 3500 nanometers and 5000 nanometers.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of warning a driver of a vehicle of an obstacle that is more than one kilometer from the vehicle, the method comprising the steps of:
   emitting MIR laser energy from the vehicle, the laser energy having a wavelength approximately between 3500 nanometers and 5000 nanometers;
   using a phase conjugate lens to orthogonally direct a portion of the laser energy that is reflected by the obstacle to an image-capturing device or sensor within the vehicle; and
   displaying an image of the obstacle to the driver, the image being based on the laser energy directed to the image-capturing device.

2. The method of claim 1 wherein the image-capturing device comprises a MIR charge coupled device.

3. The method of claim 1 comprising the further steps of:
   transmitting a signal from the image-capturing device to a processing device;
   using the processing device to create image data dependent upon the signal from the image-capturing device; and
   sending the image data from the processing device to a display device.

4. The method of claim 3 wherein the displaying step includes using the display device to display the image data.

5. The method of claim 1 wherein the laser energy has a wavelength approximately between 3700 nanometers and 4500 nanometers.

6. The method of claim 1 wherein the laser energy has a wavelength approximately between 3800 nanometers and 4300 nanometers.

7. The method of claim 1 wherein the laser energy has a wavelength approximately between 3900 nanometers and 4100 nanometers.

8. An obstacle early warning system for a vehicle, comprising:
   a sensor;
   a laser configured to emit MIR laser energy from the vehicle, the laser energy having a wavelength approximately between 3500 nanometers and 5000 nanometers;
   a phase conjugate lens to configured to:
     receive a portion of the laser energy that is reflected by the obstacle; and
     orthogonally direct the portion of the laser energy to the sensor; and
   a display device configured to display an image of the obstacle to the driver, the image being based on the laser energy directed to the sensor.

9. The system of claim 8 wherein the sensor comprises a charge coupled device.

10. The system of claim 8 further comprising a processing device configured to:
    receive a signal from the sensor;
    create image data dependent upon the signal from the sensor; and
    send the image data to the display device.

11. The system of claim 10 wherein the display is configured to display the image data.

12. The system of claim 8 wherein the laser energy has a wavelength approximately between 3700 nanometers and 4500 nanometers.

13. The system of claim 8 wherein the laser energy has a wavelength approximately between 3800 nanometers and 4300 nanometers.

14. The system of claim 8 wherein the laser energy has a wavelength approximately between 3900 nanometers and 4100 nanometers.

15. A method of warning a driver of a vehicle of an obstacle that is more than one kilometer from the vehicle, the method comprising the steps of:

emitting MIR laser energy from the vehicle, the laser energy having a wavelength approximately between 3500 nanometers and 5000 nanometers;

using a phase conjugate lens to orthogonally direct a portion of the laser energy that is reflected by the obstacle to an image-capturing device or sensor within the vehicle; and displaying a representation of the obstacle to the driver, the representation being based on the laser energy directed to the image-capturing, device.

16. The method of claim 15 wherein the displaying step includes displaying a symbol or icon representing the obstacle on a mapped view of an area less than two kilometers in front of the vehicle.

17. The method of claim 15 comprising the further steps of:
transmitting a signal from the image-capturing device to a processing device;
using the processing device to create image data dependent upon the signal from the image-capturing device; and
sending the image data from the processing device to a display device.

18. The method of claim 15 wherein the laser energy has a wavelength approximately between 3700 nanometers and 4500 nanometers.

19. The method of claim 15 wherein the laser energy has a wavelength approximately between 3800 nanometers and 4300 nanometers.

20. The method of claim 15 wherein the laser energy has a wavelength approximately between 3900 nanometers and 4100 nanometers.

* * * * *